Figure 1:
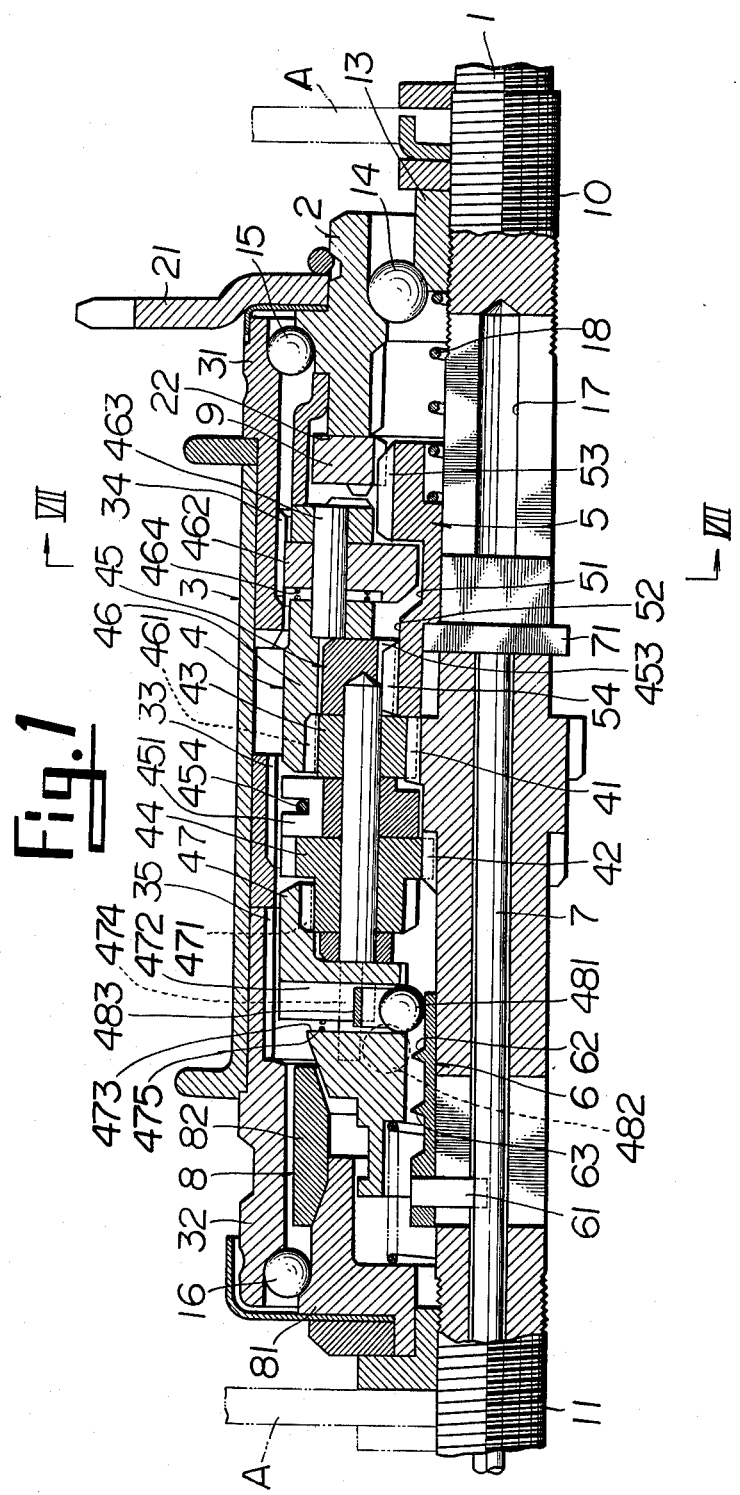

United States Patent [19]
Kine

[11] 3,973,451
[45] Aug. 10, 1976

[54] FIVE SPEED TRANSMISSION HUB FOR BICYCLES

[75] Inventor: Masayoshi Kine, Sakai, Japan

[73] Assignee: Shimano Industrial Company, Limited, Sakai, Japan

[22] Filed: Dec. 6, 1974

[21] Appl. No.: 530,379

[52] U.S. Cl.............................. 74/750 B; 74/781 B; 192/6 A
[51] Int. Cl.² ...................... F16H 3/44; F16D 67/00
[58] Field of Search .............. 74/750 B, 750 R, 766, 74/781 B; 192/6 A

[56] References Cited
UNITED STATES PATENTS

| | | | |
|---|---|---|---|
| 2,301,852 | 11/1942 | Brown.................................. | 74/766 |
| 2,769,354 | 11/1956 | Brown............................ | 192/6 A X |
| 3,366,206 | 1/1968 | Shimano........................ | 74/750 B X |
| 3,432,013 | 3/1969 | Matsumoto .................... | 74/750 B X |
| 3,438,283 | 4/1969 | Schwerdhofer .................. | 74/781 B |
| 3,670,856 | 6/1972 | Segawa........................... | 74/750 B X |

*Primary Examiner*—Samuel Scott
*Assistant Examiner*—Lance W. Chandler
*Attorney, Agent, or Firm*—Stevens, Davis, Miller & Mosher

[57] ABSTRACT

A five-speed transmission hub having a speed transmitting mechanism comprising two sun gears, two pairs of planet gears and two ring gears which are provided with pairs of rotary transmitting pawls of an engageable or disengageable control type, in which a clutch and a control mechanism thereof may be moved for controlling the pawls by the single operation of a lever, thereby making it possible to carry out the five-speed transmission of the hub.

8 Claims, 13 Drawing Figures

FIVE SPEED TRANSMISSION HUB FOR BICYCLES

This invention relates to a five-speed transmission hub and more particularly to a five-speed transmission hub which is provided with a speed transmitting mechanism comprising two sun gears, two pairs of planet gears and two ring gears which have rotary transmitting pawls of an engageable or disengageable type so that the pawls may be controlled by a single operation by moving a clutch and a control means housed in the hub, thereby making it possible to perform the five-speed transmission.

Conventionally, a transmission means capable of carrying out a five-speed transmission is already well known.

For the purpose of such five-speed transmission, a plurality of rotary transmitting pawls are provided in a hub shell to be operated in a manner that they become active or pausal in response to the bicycle speed transmission system.

In this speed transmitting operation, pawls at one side are made active for being engaged while those at the other side are made pausal for being disengaged, which requires a mutual counter-action between pawls at both sides.

In a construction such that every pawl is required to be separately operable with two operating levers, there are troublesome defects in operation as well as complicated structure resulting in operational errors. Furthermore, the operational errors cause the pawl to be unnecessarily engaged with the inner teeth formed in a hub shell resulting in a grave factor of a fault in the operation of the bicycle.

This invention has been designed in view of the above-mentioned technical defects in a conventional transmission means for a bicycle.

A main object of the invention is the provision of a five-speed transmission hub, easily operable, for controlling by the operation of a single lever a plurality of rotary transmitting pawls in an active or pausal condition.

Another object of the invention is the provision of a five-speed transmission hub which is simple in construction, free from operational errors and exactly operable in controlling the rotary transmitting pawls in an active or pausal condition.

Still another object is the provision of a five-speed transmission hub having no idling of transmission gears between each speed changing step.

This invention is directed to carry out a five-speed transmission in a manner that the driving force from a driving means is transmitted to a gear frame having planet gears and to a ring gear having inner teeth engageable with the planet gears, and a clutch controlling at least one rotary speed transmitting pawl becomes co-operable with a control means controlling another rotary transmitting pawl so that the pawls may be controlled in an engageable or disengageable condition by means of both the clutch and control means, whereby the abovementioned conventional defects have been eliminated to result in obtaining the aforesaid objects of the invention.

Figure 2:
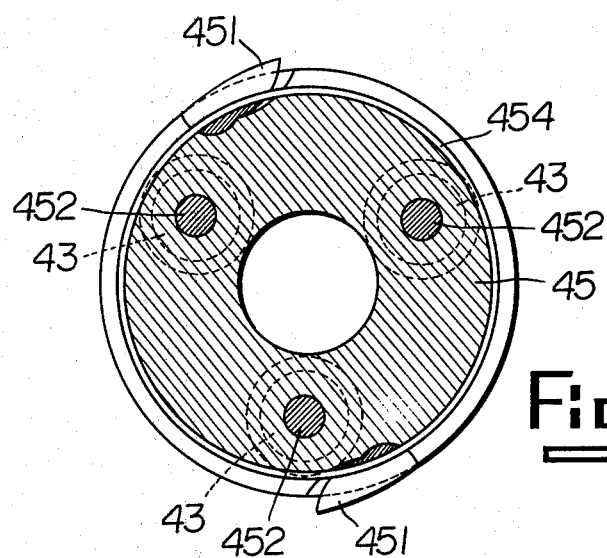
Figure 3:
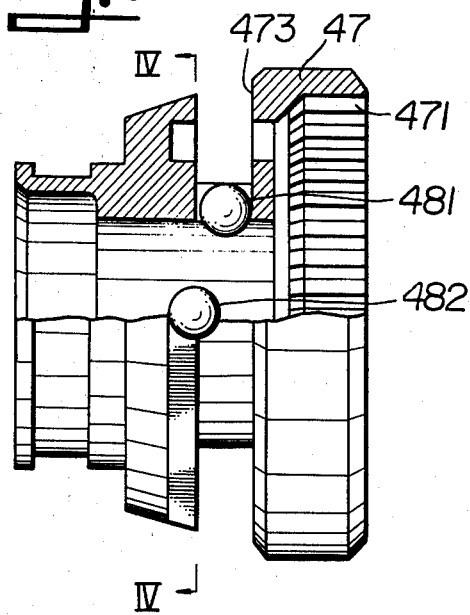
Figure 4:
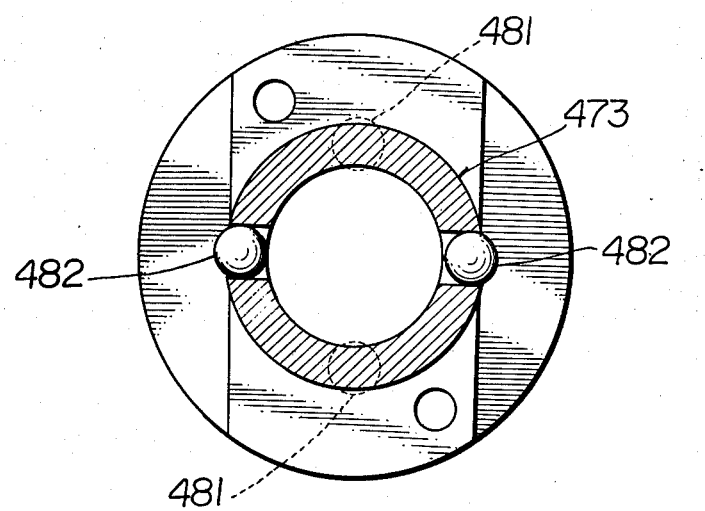
Figure 5:
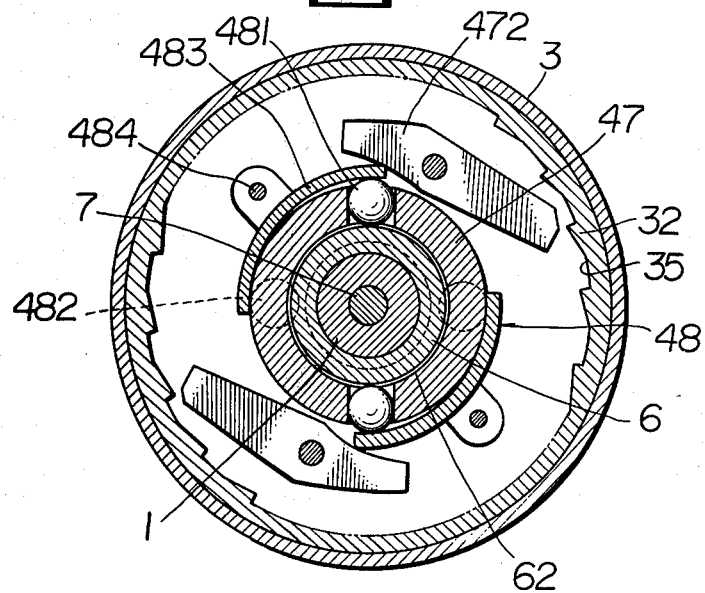
Figure 6:
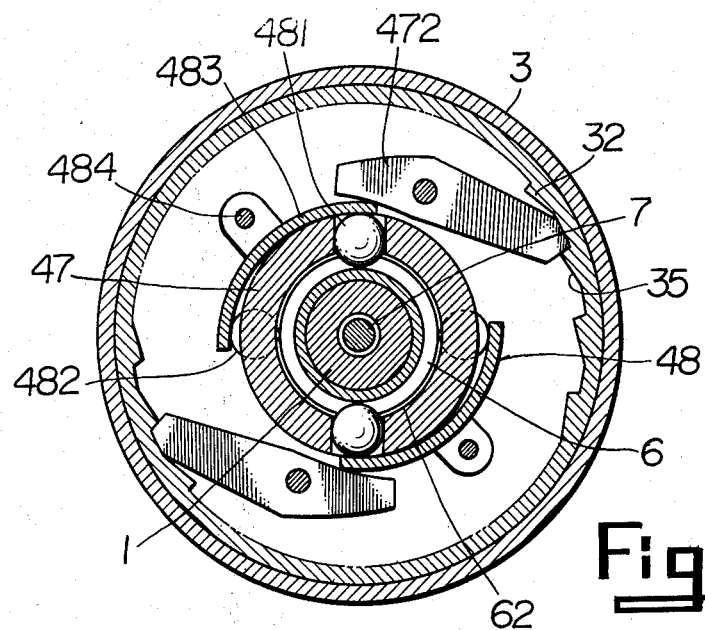
Figure 7:
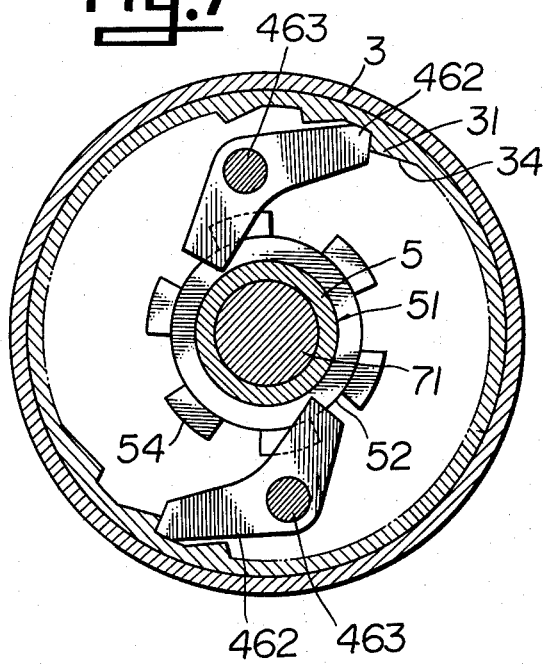
Figure 8:
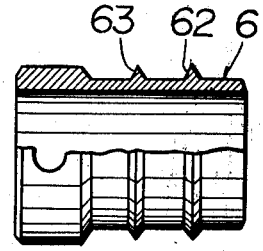
Figure 9:
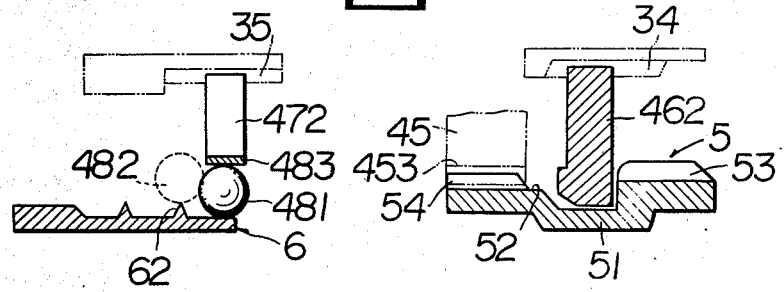

An embodiment of a five speed transmission hub according to the invention will be apparent in detail from the following description in accordance with the accompanying drawings, in which FIG. 1 is a partially cutaway front view of the hub in accordance with the invention, FIG. 2 is a cross sectional side view of a gear frame, FIG. 3 is a partially cutaway view of a ring gear at the left-hand side of the hub shell, FIG. 4 is a cross section taken on line IV—IV in FIG. 3, FIG. 5 is a cross sectional view of a ring gear at the left-hand side of the hub shell, FIG. 6 is a cross section of the ring gear in FIG. 5, showing another active condition thereof, FIG. 7 is a cross section taken on line VII—VII in FIG. 1, FIG. 8 is a partially cutaway view of a control means, and FIGS. 9 to 13 are illustrations of the relative action of a clutch and a control means at each speed transmission.

A hub shown in FIG. 1, comprises a fixed shaft 1 substantially supported with a bicycle frame A, a driving means 2 rotatably mounted to the fixed shaft 1, a hub shell 3 rotatably mounted with respect to the driving means 2, a speed transmitting mechanism 4 housed in the hub shell 3 for changing the driving force from the driving means 2 to be transmitted to the hub shell at a desired speed, a clutch 5 controllably relaying the driving force of driving means 2 to the mechanism 4, a control means 6 co-operative with the clutch 5 for controlling the rotary transmitting pawls in engagement with or disengagement from ratchet, and an operating rod 7 which is operable to allow the clutch 5 and the control means 6 to be moved to and fro in an axial direction thereof.

As is apparent from the drawings, besides the abovementioned construction of the hub, there is housed in the hub shell a brake means 8 adapted to be actuated in the reverse rotation of driving means. The speed transmitting mechanism 4 is as a whole made axially movable in order to actuate the brake means 8, and between the speed transmitting mechanism 4 and the driving means 2 an actuating member 9 is mounted relative to the driving means and the clutch 5, which actuating member permits the speed transmitting mechanism 4 to be axially moved in the reverse rotation of driving means 2.

More particularly, screw threads 10 and 11 are formed at the periphery of both ends of the fixed shaft respectively, one (11) of which (at the right-hand side in FIG. 1) is screwably engaged with a ball holder 13 which keeps a ball 14 between the ball receiving surface thereof and that formed at the inner wall of the driving means 2 so that the driving means 2 may be rotatably supported to the shaft through the ball 14.

At the right-hand end of the driving means 2 is fixed thereto a sprocket wheel 21 which is adapted to enforce the driving means 2 to be rotatable through a driving chain of a bicycle (not shown in the drawing), and at the left hand end of the same is provided a cam face 22 engageable with the actuating means 9 to be rotatable integrally therewith in the normal rotation of the driving means, while pushing the actuating means 9 axially leftwardly in the reverse rotation of the same.

The driving means 2 is provided at the outer periphery thereof with a ball receiving surface keeping a ball 15 and disposed to be rotatable through the ball to a cylindrical fixture 31 rigidly fixed to the hub shell at the right hand end portion thereof.

At the left hand end portion of the hub shell 3 is fixed a cylindrical fixture 32 similarly to the abovementioned, which is rotatably supported with respect to a brake cone 81 through a ball 16 insertably mounted between a ball receiving surface at the inner surface at the left hand end of the fixture 32 and the outer periphery of the brake cone 81 of the brake means 8.

The clutch 5 housed inside the hub shell 3 for controllably relaying the rotary force of the driving means 2, is rotatably and movably mounted onto the fixed shaft 1, and at a substantially middle portion of the clutch are formed an annular groove 51 and at an adjacent left hand side thereof an annular swollen portion 52 with a tapered guide face at one side thereof.

The clutch 5 is circumferentially provided at the right hand side adjacent to the annular groove 51 with teeth 53 incessantly engageable with inner teeth of the actuating means 9 and at the left hand side of the annular swollen portion 52 with teeth 54 engageable with inner teeth of the gear frame of the speed transmitting mechanism to be described hereinafter.

Being engaged with an operating member 7 which is inserted into a hollow 17 of the fixed shaft 1 to be axially movable by operating a speed change lever (not shown). The clutch follows the operating member axial movement for changing a driving force transmitting route from the driving means to the speed transmitting mechanism 4 and also for controlling one of rotary transmitting pawls in an active or pausal condition thereof.

A coil spring 18 is insertably mounted between the clutch 5 and the ball holder 13, which normally urges the clutch 5 to be engaged at the teeth 54 thereof with the inner teeth of the gear frame, whereby the driving force from the driving means 2 is made to be transmitted from the clutch 5 to the gear frame through teeth 53 incessantly engageable with the inner teeth of the actuating means 9.

Also, the operating member 7 is formed of a rod, and abuts at the foremost end thereof against a gear shifting key 71 which is partially extruded from the outer periphery of the fixed shaft, the key 71 being engageable with the clutch 5 as shown in FIG. 1.

Next, the speed transmitting mechanism 4 which is housed inside the hub shell 3 and forms an important part of the invention, will be described as follows.

The speed transmitting mechanism 4 comprises a gear frame 45 having two sun gears 41 and 42, each of a different diameter, formed at the fixed shaft 1 and with planet gears 43, 44 in mesh with the sun gears 41, 42 respectively; a ring gear 46 at the right hand side of the hub in FIG. 1, having inner teeth 461 engageable with the planet gears 43; a ring gear 47 at the left hand side in FIG. 1, having inner teeth 471 engageable with the planet gears 44 (hereinafter the former ring gear is called the right ring gear and the latter the left one); rotary speed transmitting pawls 451 incessantly engageable with the gear frame for being actuated at the middle and the lowest speeds (which are hereinafter called third pawls); rotary speed transmitting pawls 462 of an engageable or disengageable type, formed at the right ring gear 46 for being actuated at the highest speed (hereinafter which are called first pawls); rotary speed transmitting pawls 472 of an engageable or disengageable type, formed at the left ring gear 47 for being actuated at the high and the low speeds (hereinafter which are called second pawls); and a control means 6, in engagement with the operating member 7, axially co-operatively movable with the clutch 5.

The planet gears 43, 44 are supported to the gear frame 45 respectively by means of a common axle 452 parallel to the fixed shaft 1, which gear frame 45 is provided at the right-hand inner surface thereof with inner teeth 453 in mesh with the teeth 54 at the left hand side of the clutch 5. The third pawls 451 formed at the gear frame 45 are, as shown in FIG. 2, provided in a manner that the pawls may partially freely project from or enter into recesses formed at the outer periphery of the gear frame 45 so that each tip of the pawls 451 may be urged to be always engageable with a ratchet 33 formed at the inner surface of the hub shell by means of a spring 454 wound around the outer surface of the gear frame 45.

The right ring gear 46 is provided at an intermediate portion thereof against a notched portion in abutment with the right hand end surface of the gear frame 45, which end surface is opposite to the actuating means 9.

The first pawls 462, which are provided at the ring gear 46, are supported with axles 463 respectively in a manner that the tips of the pawls are apt to be engageable with a ratchet 34 formed at the cylindrical fixture 31 and each tail of the pawls is formed correspondingly to the annular groove 51, the annular swollen portion 52 and the teeth 54 at the clutch 5 so that the pawls may be controlled in engagement with or disengagement from the ratchet 34 by an axial movement of the clutch 5.

Furthermore, the left ring gear 47 is provided at a substantially intermediate portion thereof with a notched portion capable of being in abutment against the left hand end surface of the gear frame 45 and also is provided at the left hand outer periphery thereof with a tapered surface engageable with brake shoes 82 of the brake means 8.

The second pawls 472 are insertably mounted to an annular groove 473 formed at a thick portion leftwardly adjacent to the notched portion of the left ring gear 47 through an axle 474 in a manner that tips of the pawls are apt to be engageable with a ratchet 35 formed at the cylindrical fixture 32 by means of a spring inserted between the pawls and the wall of annular groove.

Also, the ring gear 47 is provided with a control mechanism 48 for controlling the second pawls 472 in engagement with or disengagement from the ratchet so that the pawls may be controlled by the axial movement of the control means 6.

The control mechanism 48 comprises two pairs of two balls 481, 482 movable radially of the hub and control plates 483 swinging to control the pawls by the radial movement of either a pair of balls 481 or that of balls 482. Thus, the pairs of balls 481, 482 may be radially moved by means of the control means 6 for controlling the pawls 472 in engagement with or disengagement from the ratchet.

More particularly, the balls 481 are movably inserted into holes perforated through the base of the annular groove 473 and also balls 482 are movably inserted into through holes formed across the base of the groove 473 and a flat portion formed by cutting, as shown in FIG. 1, the thick portion adjacent to the base of the groove so that the balls 482 are displaced from the balls 481 slightly axially and radially of the ring gear 47.

In addition, these balls 481 and 482 are disposed into the through holes so that they may partially be protruded outwardly of both sides of the holes respectively, namely, the pawls side and the control means side thereof.

The pawl-control plates 483 swingingly movable according to balls 481 and 482 radial movements, are, as shown in FIGS. 5 and 6, formed in an arc-shape and pivotally supported at a substantially center portion thereof to the side wall of the groove 473 through a pin 484 respectively.

One end of each of pawl-control plates 483 becomes engageable with each tail of second pawls 472 respectively for carrying out an active or pausal control of the pawls 472. Incidentally, the control plates 483 are turned by being applied with the frictional resistance stronger than the resilient force of the abovementioned spring 475 so that the pawls 472 may acutely be controlled.

The control means 6 for controlling the movement of the balls 481 and 482, is, as shown in FIG. 1, coupled with the operating member 7 by means of a pin 61 so that the same may be moved in accompanying manner with the axial movement of operating member 7. The control means 6 is formed of a cylindrical member mounted onto the fixed shaft 1 and has annular projections 62 and 63 which are formed circumferentially of the periphery of the control means for radially moving the balls 481 and 482.

The annular projections 62 and 63 are spaced correspondingly with respect to the control distance of the clutch 5 so that the projections 62 and 63 may be moved with respect to two pairs of balls 481 and 482 in a manner that one of the projections bears one pair of balls thereon at the same time the other pair of balls comes down from the other projection.

The five speed transmission hub is constructed as aforesaid, of which the operation will be described as follows mainly with respect to the speed transmission thereof.

Referring to the drawings, FIG. 1 illustrates the clutch 5 and the control means 6 which are positioned at the leftmost hand thereof respectively, where the former has the teeth 54 engaged with the inner teeth 453 of the gear frame 45 so that the driving force from the driving means 2 is transmitted to the gear frame 45 through the clutch 5. Then the driving force is transmitted to the right ring gear 46 from the gear frame 45 through the planet gears 43 for driving the hub shell 3 at the highest speed transmission through the first pawls 462 engageable with the ratchet 34.

In this instance, the driving force applied to the gear frame 45, is also transmitted to the left ring gear 47 through planet gears 44. However, the left ring gear 47 is rotatable at a lower speed than the right ring gear 46, i.e., the rotary speed of the hub shell, wherein the second pawls 472 on the left ring gear 47 are, as shown in FIG. 6, engaged with a ratchet 35, being not operable but merely slidable thereto.

Also, having an engageable relationship with the ratchet 33, the third pawls 451 are not active, but merely slidable thereto because of rotary speed of the hub shell higher than that of gear frame 45.

Figure 10:
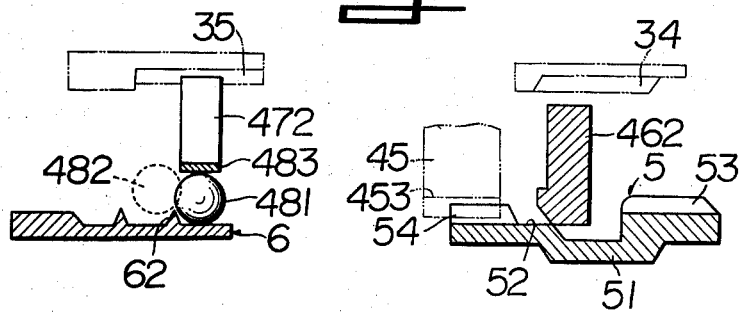

Next, for changing the bicycle speed from the highest to a high speed, the operating member 7 is operated to be moved for allowing the clutch 5 and the control means 6 to be rightwardly moved as shown in FIG. 10.

Namely, in this operation, the first pawls 462 ride the annular swollen portion 52 of the clutch 5 to be leaned therewith, resulting in disengagement from the ratchet 34.

At the same time, the control member 6 is rightwardly moved, nevertheless, the ball is, as shown in FIG. 10, not positionally affected with respect to the same; thus the second pawls 472 are kept in engagement with the ratchet 35.

Accordingly, the driving force apllied to the gear frame 45 is transmitted therefrom to the hub shell under the high speed transmission through planet gears 44, the left ring gear 47 and the second pawls 472, thereby rotating the hub shell 3 at high speed, where the third pawls 451 are idle as with the the highest speed transmission as aforesaid.

Figure 11:
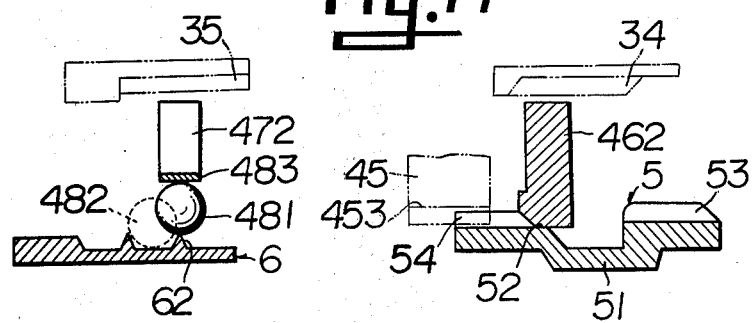

Furthermore, the change from the high speed to the middle speed transmission is carried out by farther rightwardly moving the clutch 5 and the control means 6 with the operating member 7 as shown in FIG. 11. In this instance, both clutch 5 and gear frame 45 having the same transmission relationship as the abovementioned high speed transmission, the latter is continuously rotated, while the control means 6 radially outwardly pushes the balls 481 with the annular projection 62 so as to be seated on the top thereof; at the same time, the balls 482 already seated on the projection reversely come down therefrom to be radially inwardly moved. As a result, the pawl-control plates 483 swing as shown in FIG. 5, for pushing the tails of the second pawls 472 respectively to cause the utmost end thereof to be disengaged from the ratchet 35.

Accordingly, the first pawls 462 and the second pawls 472 being either pausal, the driving force applied to the gear frame 45 is transmitted to the hub shell under the middle speed transmission through only the third pawls 451 thereby allowing the hub to be rotatable at the middle speed.

Figure 12:
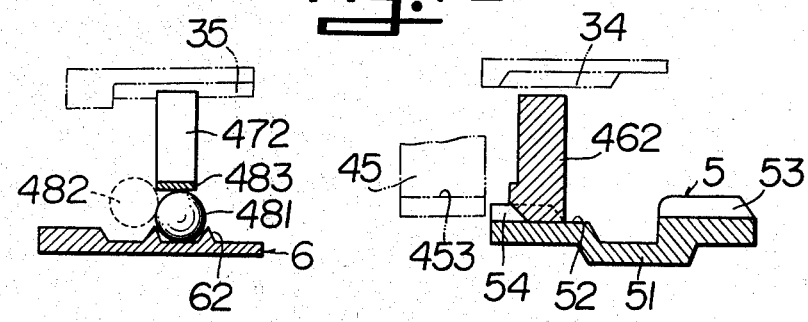
Figure 13:
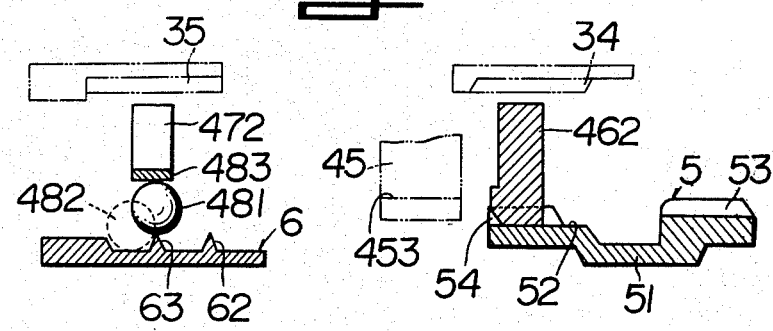

Furthermore, for changing from the middle speed transmission to the low speed, the clutch 5 and the control means 6 may, as shown in FIG. 12, be still farther rightwardly moved by means of the operating member 7.

As a result, the teeth 54 of clutch 5 become disengageable from the inner teeth 453 at the gear frame 45 by the rightward movement of clutch 5 to be engageable with the first pawls 462 as is in disengagement thereof from the ratchet 34, whereby the driving force transmitting route is shifted from the gear frame 45 to the right ring gear 46 through the first pawls 462 only.

In this instance, since the first pawls are in disengagement from the ratchet 34, the driving force is transmitted from the right ring gear 46 to the gear frame 45 through the planet gears 43 and the control means 6 is farther rightwardly moved to cause the projection 63 to upwardly outwardly push the balls 482 from the top of projection 62 while the balls 481 come down, thereby making the second pawls 472 engageable again with the ratchet 35.

Thus, the driving force applied to the gear frame 45 is transmitted from the planet gears 44 to the left ring gear 47, thereby permitting the hub shell to be rotatable at the low speed transmission through the second pawls 472 engaged with the ratchet 35, where the third pawls 451 are idle.

Lastly, changing from the low speed transmission to the lowest speed, may be carried out by moving the clutch 5 and the control means 6 most rightwardly axially thereof, where the speed transmission from the clutch 5 to the right ring gear 46 in disengagement of the first pawls 462 from the ratchet 34, is the same as the abovementioned low speed transmission. Simultaneously, the control means 6 pushes the balls 481 radially outwardly by means of the projection 63 thereof so that the second pawls 472 may be disengaged from the ratchet 35.

Resultantly, the driving force which is, as the same as the low speed transmission, transmitted from the right ring gear 46 to the gear frame 45 through planet gears 43, leads to the hub shell 3 through the third pawls 451, thereby driving the hub shell 3 under the lowest speed transmission.

For a fuller understanding, the steps of the abovementioned transmission will briefly be arranged in the following table, where the reference letter X designates the engagement of pawls with the ratchet, Y designates the inactive conditions of the pawls, i.e., isolations from the ratchet caused by the clutch 5 or the control means 6 and Z designates sliding of the pawls from the speed difference between each speed transmission even in engagement with the ratchet, namely, idling rotation of the pawls, and the description "Route" indicates the route for transmitting the driving force from the clutch 5 to the speed transmitting mechanism, i.e., either the gear frame 45 or the right ring gear 46.

The Table

|  | First Pawls | Second Pawls | Third Pawls | Route |
| --- | --- | --- | --- | --- |
| Highest Speed | X | Z | Z | Gear Frame |
| High Speed | Y | X | Z | Gear Frame |
| Middle Speed | Y | Y | Y | Gear Frame |
| Low Speed | Y | X | Z | Right Ring Gear |
| Lowest Speed | Y | Y | X | Right Ring Gear |

As is clearly understood from the abovementioned description, the present invention is directed to carry out an active or pausal control of the rotary speed transmitting pawls by means of the clutch and the control means co-operative therewith, thereby making a five-speed transmission by a single operation system.

Accordingly, since conventional two system operation devices are not required, the five-speed transmission hub of the invention becomes easy in operation as well as simple in construction, and also free from operational errors for obtaining the exact multi-speed gear shifting of a bicycle.

In addition, at least one pair of the rotary speed transmitting pawls are formed in an incessantly engageable type; therefore, even if other pawls are disengaged from the clutch on the way of speed transmission, there is no idling of the bicycle pedals.

While the form of embodiment of the invention as herein described constitutes a preferred form, it is to be understood that other forms might be adopted, all coming within the scope of the following claims.

What is claimed is:

1. A five-speed transmission hub comprising;
  a. a hub shell having first, second and third ratchets,
  b. a fixed shaft extending through the center of said hub shell,
  c. two sun gears of different diameter from each other and fixed to said fixed shaft respectively,
  d. two kinds of planet gears engaged with said sun gears respectively,
  e. a right ring gear and a left ring gear, having inner teeth engageable with said planet gears respectively,
  f. a gear frame supporting said planet gears,
  g. first rotary speed transmitting pawls, at least one of which is supported with said right ring gear in a relationship of being engaged with or disengaged from said first ratchet,
  h. second rotary speed transmitting pawls, at least one of which is supported with said left ring gear in a relationship of being engaged with or disengaged from said second ratchet,
  i. third rotary speed transmitting pawls, at least one of which is supported with said gear frame so as to be incessantly engaged with said third ratchet,
  j. a driving means having an inner surface and rotatably supported between said fixed shaft and said hub shell,
  k. a clutch selectively transmitting the driving force from said driving means to either said gear frame or said right ring gear, said clutch being adapted to be movable along said fixed shaft, thereby controlling said first speed transmitting pawls in engagement with or disengagement from the first ratchet,
  l. means for moving said clutch, and
  m. a control means controlling said second pawls in engagement with or disengagement from the second ratchet, said control means being attached to said means for moving said clutch so as to be movable together therewith.

2. The five-speed transmission hub according to claim 1, wherein said clutch has a substantially middle portion of a reduced diameter and transmitting teeth at both outer peripheries adjacent to said middle portion, said teeth at one of said outer peripheries being incessantly engageable with the inner surface of said driving means, said teeth at the other of said outer peripheries being engageable with said gear frame or the first rotary speed transmitting pawls, whereby when the latter teeth of said clutch become engageable with the first rotary speed transmitting pawls said pawls become disengageable from said first ratchet for transmitting the driving force from the clutch to the right ring gear through said first pawls.

3. The five-speed transmission hub according to claim 1, wherein said means for moving the clutch includes a rod which is provided with a first key engageable with said clutch and a second key engageable with said control means so that the movement of said rod allows said clutch and control means to be moved simultaneously.

4. The five-speed transmission hub according to claim 1, wherein said control means includes balls radially movable by the movement of said control means and control plates swingingly movable by the movement of said balls, said control plates being in contact at one end thereof with the root portions of said second rotary transmitting pawls respectively.

5. The five-speed transmission hub according to claim 4, wherein said left ring gear is provided with an annular groove which has holes perforated through the base thereof, said holes having diameters slightly larger than those of said balls for keeping said balls therein, and said control plates are formed in a circular arc shape corresponding to said annular groove respectively so that the control plates may be in contact at the inner surface thereof with said balls and at the outer surface thereof with the root portions of said second rotary transmitting pawls respectively.

6. The five-speed transmission hub according to claim 4, wherein two pairs of said balls are disposed in an axial direction of said fixed shaft, one pair of said balls being brought into contact with one end of the inner surface of each control plate and the other pair of balls being brought into contact with the other end of the inner surface of each control plate so that said control means may be moved to cause said balls to be radially movable separately of each pair thereof, thereby permitting said control plates to be swingingly movable.

7. The five-speed transmission hub according to claim 1, wherein said control means is formed of a cylindrical body movable along said fixed shaft, said cylindrical body being provided at the outer periphery thereof with annular projections for controlling said second rotary speed transmitting pawls.

8. The five-speed transmission hub according to claim 7, wherein said control means is brought into contact at the outer periphery thereof with balls which are made immovable only axially of said control means so that said balls may be made radially movable by means of said annular projections.

* * * * *